United States Patent
Angerer et al.

(10) Patent No.: US 9,664,493 B2
(45) Date of Patent: May 30, 2017

(54) BENDING PRESS HAVING AN ANGLE-MEASURING DEVICE AND METHOD FOR DETERMINING THE BENDING ANGLE

(71) Applicant: TRUMPF Maschinen Austria GmbH & Co. KG., Pasching (AT)

(72) Inventors: Gerhard Angerer, Altenberg (AT); Harald Boeck, Enns (AT); Klemens Freudenthaler, Linz (AT); Josef Gaggl, Steyr (AT); Matthias Hoerl, Oberndorf/Tirol (AT); Bernhard Schneider, Lenzing (AT); Hagen Strasser, Pasching (AT); Helmut Theis, Pfarrkirchen (AT); Manfred Waldherr, Linz (AT); Thomas Weiss, Linz (AT)

(73) Assignee: TRUMPF Maschinen Austria GmbH & Co. KG., Pasching (AT)

( * ) Notice: Subject to any disclaimer, the term of this patent is extended or adjusted under 35 U.S.C. 154(b) by 152 days.

(21) Appl. No.: 14/408,698

(22) PCT Filed: Jun. 12, 2013

(86) PCT No.: PCT/AT2013/050119
§ 371 (c)(1),
(2) Date: Dec. 17, 2014

(87) PCT Pub. No.: WO2013/188896
PCT Pub. Date: Dec. 27, 2013

(65) Prior Publication Data
US 2015/0153148 A1 Jun. 4, 2015

(30) Foreign Application Priority Data
Jun. 18, 2012 (AT) .................................. A 692/2012

(51) Int. Cl.
*G01B 5/24* (2006.01)
*B21D 5/02* (2006.01)
(Continued)

(52) U.S. Cl.
CPC ................ *G01B 5/24* (2013.01); *B21D 5/006* (2013.01); *B21D 5/02* (2013.01); *B21D 5/0209* (2013.01); *B21D 5/16* (2013.01); *G01C 9/02* (2013.01)

(58) Field of Classification Search
CPC .......... B21D 5/00; B21D 5/004; B21D 5/006; B21D 5/01; B21D 5/02; B21D 5/0209;
(Continued)

(56) References Cited

U.S. PATENT DOCUMENTS 4,489,586 A * 12/1984 Hess ..................... B21D 5/0209
 72/31.11
5,584,199 A * 12/1996 Sartorio ............... B21D 5/0209
 72/18.1

(Continued)

FOREIGN PATENT DOCUMENTS

CN 101281032 A 10/2008
CN 102120230 A 7/2011
(Continued)

OTHER PUBLICATIONS

International Search Report of PCT/AT2013/050119, mailed Nov. 18, 2013.

*Primary Examiner* — Peter DungBa Vo
*Assistant Examiner* — Joshua D Anderson
(74) *Attorney, Agent, or Firm* — Collard & Roe, P.C.

(57) ABSTRACT

The invention relates to a production plant (1), in particular for folding workpieces (2) to be produced from sheet metal, comprising a bending press (3), in particular a press brake, having a press beam (13, 16), at least one bending tool (4),
(Continued)

such as a bending punch (5) and bending die (6), which is connected to the press beam (13, 16), and at least one angle-measuring device (46) for determining an angular position of at least one limb (35, 36) of the workpiece (2) formed by a bending operation relative to a reference plane (41, 42). The angle-measuring device (46) comprises at least one inclination sensor (39) having a reference surface (40) and the inclination sensor (39) is mounted by the angle-measuring device (46) so that it can be placed with the reference surface (40) lying in contact with a surface portion of at least one of the limbs (35, 36) of the workpiece (2).

25 Claims, 5 Drawing Sheets

(51) Int. Cl.
    *B21D 5/16*    (2006.01)
    *G01C 9/02*    (2006.01)
    *B21D 5/00*    (2006.01)

(58) Field of Classification Search
CPC . B21D 5/16; B21D 11/20; G01B 5/24; G01B 7/30; G01B 21/22; G01C 9/02; G01C 19/44; G01C 19/5621; G01C 19/5656; G01C 19/5684; G01C 19/5712
USPC .......... 72/14.8, 14.9, 15.3, 16.1, 16.2, 16.4, 72/16.5, 17.3, 18.1–18.3, 19.1, 19.3, 31.1, 72/31.12, 379.2, 389.2, 389.3, 702, 31.11
See application file for complete search history.

(56) References Cited

U.S. PATENT DOCUMENTS

| | | | |
|---|---|---|---|
| 5,661,671 A | 8/1997 | Ooenoki et al. | |
| 6,571,589 B1 * | 6/2003 | Ito | B21D 5/02 72/31.1 |
| 7,231,825 B2 * | 6/2007 | Davidson | G01C 9/02 73/510 |
| 2007/0283587 A1 * | 12/2007 | Cerwin | G01B 7/30 33/471 |

FOREIGN PATENT DOCUMENTS

| | | |
|---|---|---|
| CN | 202114149 U | 1/2012 |
| DE | 694 11 821 T2 | 12/1998 |
| EP | 0 637 371 B1 | 2/1995 |
| EP | 1 319 450 A1 | 6/2003 |
| EP | 1 541 965 A1 | 6/2005 |
| JP | H03259705 A | 11/1991 |
| JP | 1994-328142 A | 11/1994 |
| JP | 1995-324930 A | 12/1995 |
| JP | H07-328723 A | 12/1995 |
| JP | H07-332961 A | 12/1995 |
| JP | H10286627 A | 10/1998 |
| JP | 2001-074407 A | 3/2001 |
| JP | 2001-121216 A | 5/2001 |
| JP | 2001-330403 A | 11/2001 |
| JP | 2004-053530 A | 2/2004 |
| JP | 2004-361237 A | 12/2004 |
| JP | 2007-114077 A | 5/2007 |
| JP | 2010/005697 A | 1/2010 |
| JP | 2011-206804 A | 10/2011 |
| JP | 2012-058006 A | 3/2012 |

\* cited by examiner

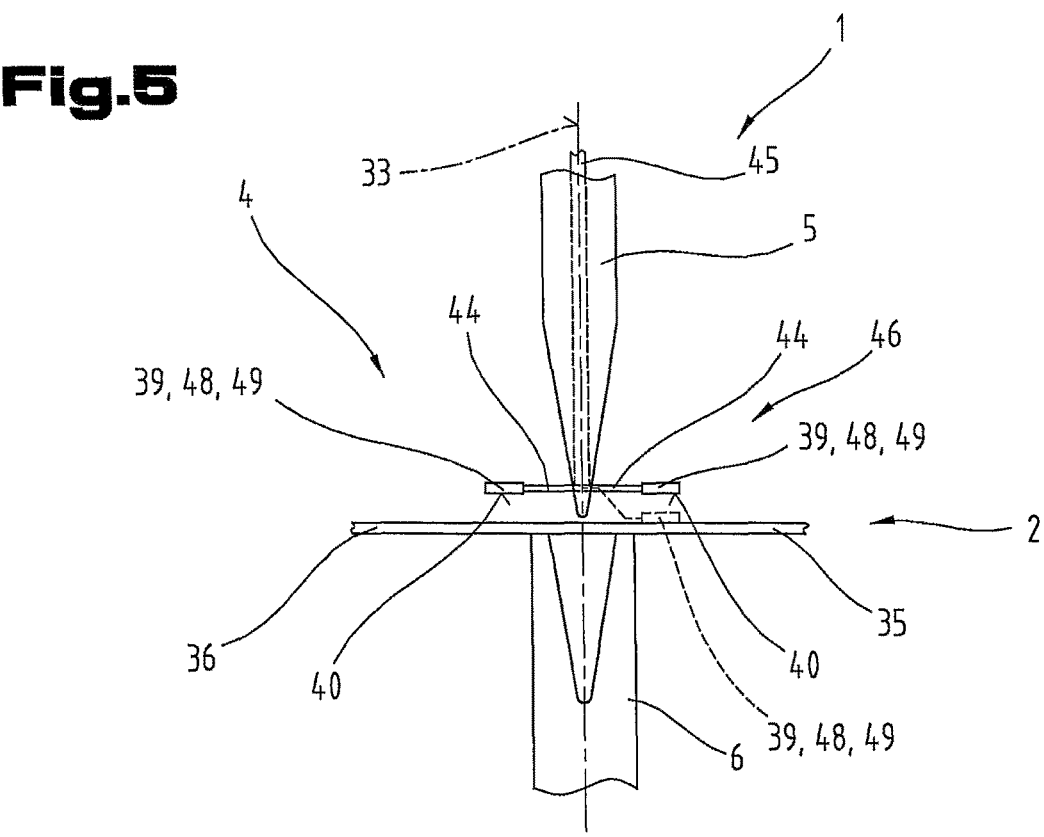
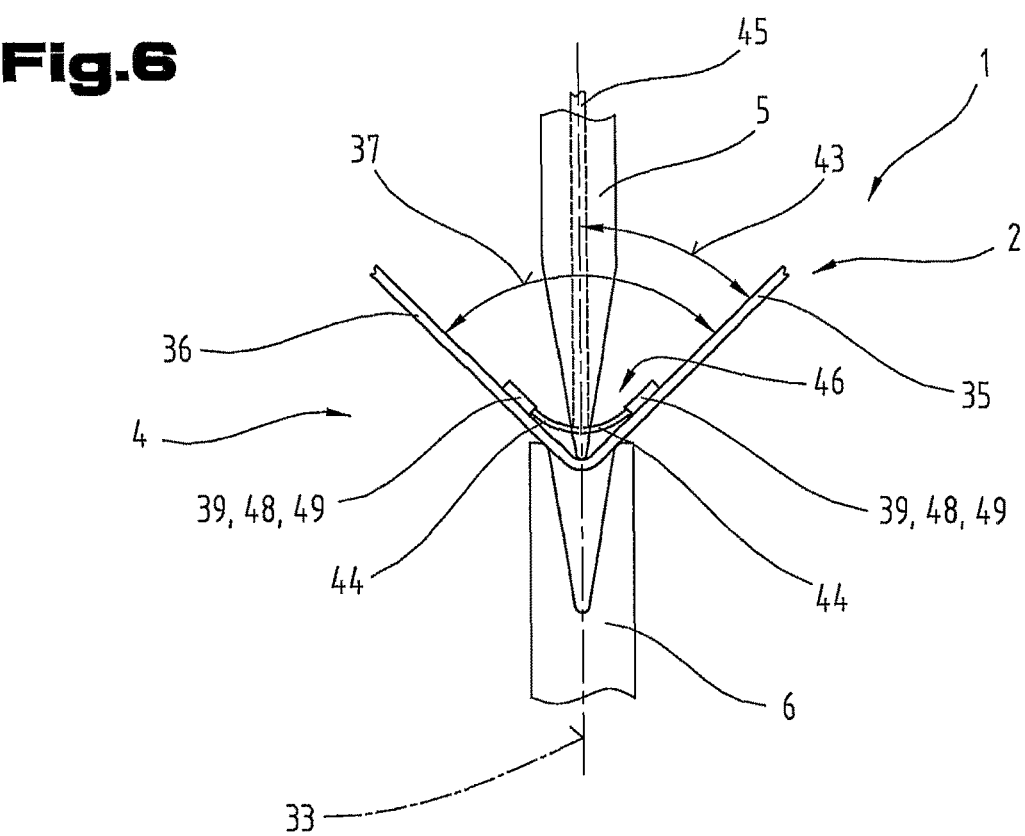

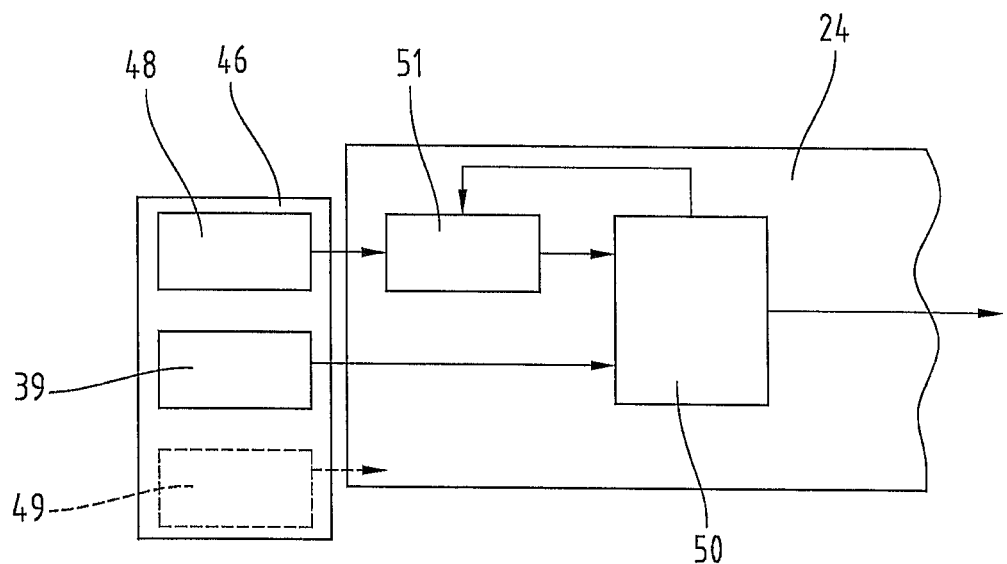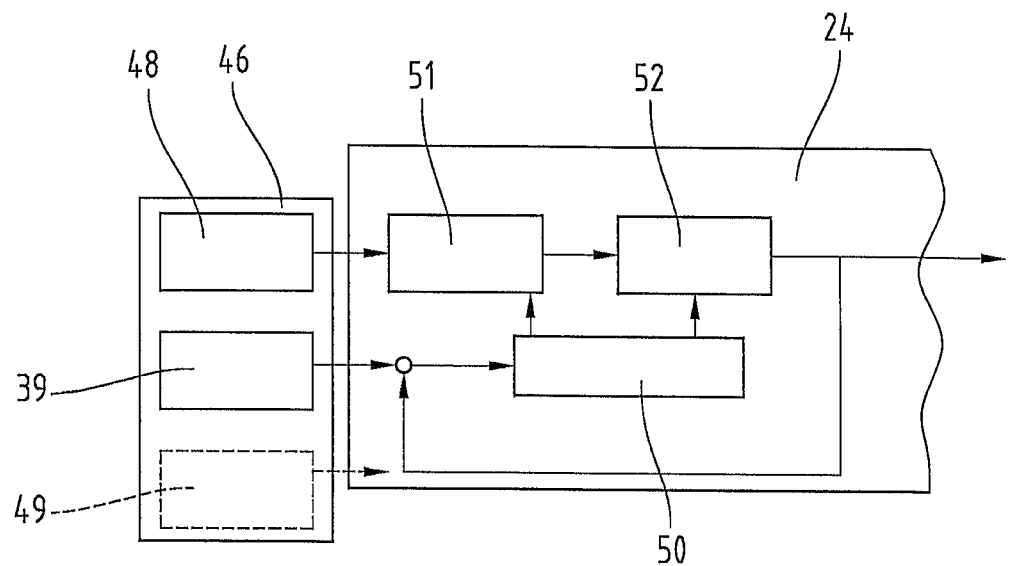

BENDING PRESS HAVING AN ANGLE-MEASURING DEVICE AND METHOD FOR DETERMINING THE BENDING ANGLE

CROSS REFERENCE TO RELATED APPLICATIONS

This application is the National Stage of PCT/AT2013/050119 filed on Jun. 12, 2013, which claims priority under 35 U.S.C. §119 of Austrian Application No. A 692/2012 filed on Jun. 18, 2012, the disclosure of which is incorporated by reference. The international application under PCT article 21(2) was not published in English.

BACKGROUND OF THE INVENTION

1. Field of the Invention

The invention relates to a production plant, in particular for folding workpieces to be produced from sheet metal, having an angle-measuring device, and a method for determining an angular position of at least one limb formed by a bending operation relative to a reference plane, as described in claims 1 and 12.

2. Description of the Related Art

From EP 0 637 371 B1 and the earlier document DE 694 11 821 T2, a device for measuring an angle on a workpiece is known, having feelers disposed in a base of the bending tool, which can be moved relative to the base. Each of the feelers has contact devices for contacting with the respective portion of the workpiece during the measurement, and the sensors are kinematically totally independent of one another. The device also has separate thrust mechanisms for moving the contact devices of the feelers into contact with the respective portions of the workpiece being measured. The thrust mechanisms co-operating with one feeler are totally independent of the thrust mechanisms co-operating with the other respective feeler. The thrust mechanism also enables the respective feeler to effect a movement in translation relative to the base totally independently of the movement of the other feeler. In addition, a sensor mechanism is provided, which is used to detect the position of the feelers relative to the base. To this end, each of the feelers has an active surface for establishing contact with the respective portion of the workpiece. The sensor mechanism in turn has a pair of distance-measuring elements, which are spaced apart from one another at a known distance and lie in a plane of the angle to be measured, and the measuring elements are connected to the displaceable feelers at two different points. Accordingly, a pair of these feelers and the connected measuring elements are disposed inside the base on which the workpiece is supported during the production process.

Bending angle measurements have also been taken in the past using digital image processing, distance sensors, light-slit sensors, feeler pins, measuring forks, rotatable die elements, contact plates or similar.

For the most part, these measuring devices are of a complicated design and are susceptible to faults to a large degree.

SUMMARY OF THE INVENTION

The objective of the invention is to propose an angle-measuring device for workpieces to be produced from sheet metal that is easy for the user to operate and above all takes accurate measurements.

This objective is achieved by the invention on the basis of the features defined in claim 1. The advantage obtained as a result of the features defined in claim 1 is that the inclination measurement is taken directly on at least one of the limbs of the workpiece, where the actual angular position of the respective limb relative to the preferably perpendicular or horizontal reference plane obtained inside the inclination sensor itself can be determined, enabling the best possible approximation to a predefined bending angle based on this measurement value. Being an electrical sensor element, the inclination sensor delivers in particular an electric measurement signal which can be further processed and evaluated by means of a control device, which may also be the controller of the bending press. Despite having very small external dimensions of a few millimeters, a microelectronic design of the inclination sensor enables an angle measurement resolution of approximately 0.001°, for example, and a repetition accuracy of approximately 0.01°, which is easily sufficient for the purpose of bending accuracy. Such measuring accuracy has not been possible in the past using known angle-measuring devices or has only been so using very complex designs.

In a production unit proposed by the invention, the relevant angular position can be determined rapidly and reliably, and the determined angle can be used in different ways, depending on the time the measurement is taken. To this end, the inclination sensor is placed on the workpiece manually or on an automated basis at the instant the angle measurement is desired and, if necessary, can also be held in place on the limb during the bending operation. By positioning the inclination sensor accordingly in the angle-measuring device, a simple and reliable measurement of the angle of inclination can be taken and, based on it, the bending angle. Due to the surface contact of the inclination sensor with its reference surface on a surface section of the sheet metal, slight surface irregularities and thus any associated measurement errors can be better compensated. As a result, there is no need to install additional and usually more complex measuring equipment next to the production plant, as is required in the case of optical measuring systems. At the same time, the disruptive effects of tools and such like which often occur with conventional measuring methods can be reduced.

The angle between two limbs of a workpiece created following a partially or fully completed bending operation can be determined by a single measurement, e.g. by placing a limb on a plane with a known angular position, e.g. a horizontal support surface, and then measuring the angular position of the second limb by means of the inclination sensor. Alternatively, the angular positions of both limbs can be measured respectively by means of an inclination sensor, in which case there is no need to provide a support surface.

The angle measurement can be taken during a bending operation at specific instants or continuously, in other words for as long as bending forces are still acting on the workpiece or alternatively when the workpiece is not being subjected to load, as a result of which a bending angle actually achieved can be determined taking account of elastic rebound.

The measurement may also take place when the bending operation has been interrupted, in which case an anticipated desired bending angle based on the workpiece properties and the settings used for the bending press can be compared with the measured actual bending angle, and the rest of the bending operation can be run with corrected settings based on any variances found in the bending behavior. Accordingly, constant and accurate bending results can be obtained in spite of fluctuations in the material properties such as sheet metal thickness, yield strength, etc., for example.

The angle measurement may naturally also be taken once a bending operation has been terminated, thereby enabling the bending behavior of a material batch for several workpieces of the same type to be determined on a sample workpiece, for example, based on which the bending parameters of the bending press can be adapted.

The angle-measuring device of the production plant can even be used to measure workpieces that were bent on a different bending press or to run corrective bending operations in the production plant, for example. Also of advantage is another embodiment defined in claim 2 because adequate measuring accuracy can be achieved by the sensor even though it is not particularly complex. However, care must be taken to ensure that the sensor is disposed with its measuring direction exactly aligned with the bending line of the workpiece to be produced from the sheet metal.

Also of advantage is another embodiment defined in claim 3 because in terms of operation and above all the disposition of the inclination sensor on the surface section of the sheet metal by reference to the measuring direction, the requirements placed on the orientation thereof are not so stringent. This is made possible because the inclination sensor determines the angle along two axes. A turned position of the positioned inclination sensor within the reference surface can therefore be eliminated on a computerized basis.

Also of advantage is another embodiment defined in claim 4 because the measuring device, in particular the angle-measuring device formed thereby, may comprise several different sensors, and each of the individual sensors covers a different partial measurement range of the total possible measurement range. Splitting the total measurement range into individual partial measurement ranges enables the measuring accuracy to be increased. This is the case in particular if the individual partial measurement ranges disposed directly one after the other mutually overlap. As a result, the individual sensors can each be used in the region of their highest measuring accuracy.

The inclination sensor can be placed on the limb to be measured before the start of the bending operation already so that the bending operation can be monitored from the outset by taking a measurement value. This also enables an exact difference in angle to be determined between the initial position and the final position.

Based on another variant, it is also possible to double check the bending result by taking a measurement on completion of the bending operation. This enables any relevant correction to be applied immediately once the pressing force of the bending tool applied for forming purposes has been halted and the accompanying rebound of the limb has ceased without the need for additional manipulation of the workpiece. This makes it possible to react rapidly, for example to changes in material quality, because exact control of the bending angle is always possible with each of the workpieces.

The angle-measuring device with the inclination sensor may be disposed immediately adjacent to the bending tool of the bending press as defined in claim 5, enabling a direct, accompanying measurement of a bending operation by the bending press to be carried out.

However, it is also possible to dispose the angle-measuring device at a distance apart from the bending tools as defined in claim 6, which makes it necessary to move a workpiece within the production plant in order to carry out angle measurements but enables measurements to be taken on one workpiece whilst a bending operation is being carried out in the bending press on another workpiece.

Another embodiment defined in claim 7 is of advantage because the risk of injury to the operator can be still further reduced due to the fact that the inclination sensor does not have to be manually positioned. The arrangement designed to provide a stationary hold directly on the sheet metal to be formed which can be used if necessary means that additional complicated contacting parts can be dispensed with. This also further improves measuring accuracy.

An embodiment as defined in claim 8 is also of advantage because it enables a varied range of means to be used to obtain an exact contacting hold of the inclination sensor on the surface portion of the limb. Depending on which holding means is chosen, this allows the respective material of the sheet metal to be processed or the surface properties to be taken into account.

Based on another embodiment defined in claim 9, the operation of positioning the sensor for each bending operation can be made easier because the inclination sensor is disposed directly adjacent to the working plane but at a distance apart from it in the direction of the depth. Accordingly, a perfect measuring operation can be carried out without the need for additional handles. This saves on assembly time and also further increases operating safety.

The advantage of the embodiment defined in claim 10 is that it enables the bending angle subtended by the limbs to be determined even more exactly. This is because the exact angular position can be determined on both limbs, which means that the actual bending angle can be calculated or determined very accurately.

Based on the embodiment defined in claim 11, the advantages of the different sensor types can be combined and due to the high measuring speed of the rotary rate sensor, a measurement can also be taken during the bending operation, it being possible in particular for the instantaneous bending angle to be constantly monitored. The rotary rate sensor does not measure the angle of inclination directly but rather the angular velocity at which the inclination of the rotary rate sensor changes. The change in the angle of inclination can be calculated by a mathematical integration of the measured angular velocities within a specific curve. In order to obtain a correct absolute value of the angle of inclination, the integration constant is determined from a known initial position or from the measurement values of the inclination sensor.

The use of a temperature sensor as defined in claim 12 enables the measuring accuracy to be increased because changes in temperature affecting the measurement result can be compensated.

Due to the embodiment defined in claim 12, an angle-measuring device can be obtained which delivers very exact measurement values with a high degree of precision and reliability whilst requiring the minimum amount of space. An approximately square-shaped inclination sensor is possible with dimensions based on an edge length of less than 10 mm.

However, the objective of the invention is also achieved by a method of determining an angular position of at least one limb formed by the bending operation relative to a reference plane based on the features defined in claim 14. The advantages gained by the combination of features defined in the characterizing part of this claim reside in the fact that the inclination measurement is taken directly on at least one of the limbs of the workpiece, where the actual angular position of the respective limb relative to the pre-defined reference plane can be determined. This being the case, at least on completion of the bending operation, the corresponding angular position can always be determined rapidly and reliably because the inclination sensor is disposed in contact with and lying on the workpiece at the instant a calculation of the angle is desired and optionally is also held in a fixed position, thereby enabling a reliable and simple calculation. During the course of the bending operation, the mutual displacement of the bending tools can then be run on an automated basis in particular because a reliable measurement value can be determined in the immediate vicinity of the bending line but at a safe distance from it. Due to the surface contact of the inclination sensor with its reference surface lying on a surface section of the sheet metal, slight surface irregularities and any resultant measurement errors can be more effectively compensated. This also obviates the need to install next to the production plant what would usually be more complex additional measuring devices such as needed in the case of optical measuring systems. This also reduces the disruptive effects of tools and such like, which often occur in the case of conventional measuring methods.

Another approach based on the features defined in claim 15 is of advantage because an adequate measuring accuracy can already be obtained with a sensor that is not particularly complex. However, this does mean that care must be taken to ensure that the sensor is oriented with its measuring direction exactly aligned relative to the bending line of the workpiece to be produced from the sheet metal.

Another advantageous approach is defined in claim 16, whereby operation of and above all the disposition of the inclination sensor on the surface section of the sheet metal relative to the measuring direction are not subject to such stringent requirements in terms of orientation. This is made possible due to the fact that the angle is determined by the inclination sensor along two axes.

Also of advantage is a variant of the method as defined in claim 17 because it enables an inclination sensor to be obtained which delivers very exact measurement values with a high degree of precision and reliability whilst requiring the minimum amount of space.

An approach as defined in claim 18 is also of advantage because a measurement value is determined from the start of the bending operation already and the bending operation can be monitored. This enables an exact difference in angle between the initial position and the final position to be determined.

Another advantageous approach is defined in claim 19 because the risk of injury to the operator can be still further reduced due to the fact that the inclination sensor does not have to be manually positioned. The arrangement designed to provide a stationary hold directly on the sheet metal to be formed which can be used if necessary means that additional complicated contacting parts can be dispensed with. This also further improves measuring accuracy.

An approach based on the features defined in claim 20 is also of advantage because in addition, errors in setting up the machine or the orientation of the sheet metal can be determined prior to running the bending operation and can be taken into account accordingly during other calculations and for determining the bending angle.

Another approach defined in claim 21 is of advantage because it is also possible to double check the bending result. This enables any relevant correction to be applied immediately once the pressing force of the bending tool applied for forming purposes has been halted and the accompanying rebound of the limb has ceased without the need for additional manipulation of the workpiece. This makes it possible to react rapidly, for example to changes in material quality, because exact control of the bending angle is always possible with each of the workpieces.

Finally, another variant of the method defined in claim 22 is of advantage because it enables the bending angle subtended by the limbs to be determined even more exactly. This is because the exact angular position can be determined on both limbs, which means that the actual bending angle can be calculated or determined very accurately.

A method implemented as defined in claim 23 enables a very high measuring frequency due to the measuring dynamics of a rotary rate sensor, which means that a measurement can also be taken during the bending operation as the bent limbs are being moved.

Using a Kalman filter to correlate the measurement values of the rotary rate sensor and inclination sensor as defined in claim 24 increases the reliability of the measurement results because the effect of incidental errors is reduced.

The measurement reliability can be further enhanced by a temperature compensation as defined in claim 25.

BRIEF DESCRIPTION OF THE DRAWINGS

To provide a clearer understanding, the invention will be described in more detail below with reference to the appended drawings.

These are highly schematic, simplified diagrams illustrating the following:

FIG. 5 a side view showing a part-region of the production plant having a different arrangement and holding system of the inclination sensor before the start of the bending operation;

FIG. 6 a side view showing the part-region illustrated in FIG. 5 during the bending and measuring operation;

FIG. 7 a diagram illustrating how measurement values of a rotary rate sensor are correlated with measurement values of an inclination sensor;

FIG. 8 a diagram showing an alternative way of correlating measurement values of a rotary rate sensor with measurement values of an inclination sensor.

DETAILED DESCRIPTION OF THE PREFERRED EMBODIMENTS

Figure 1:
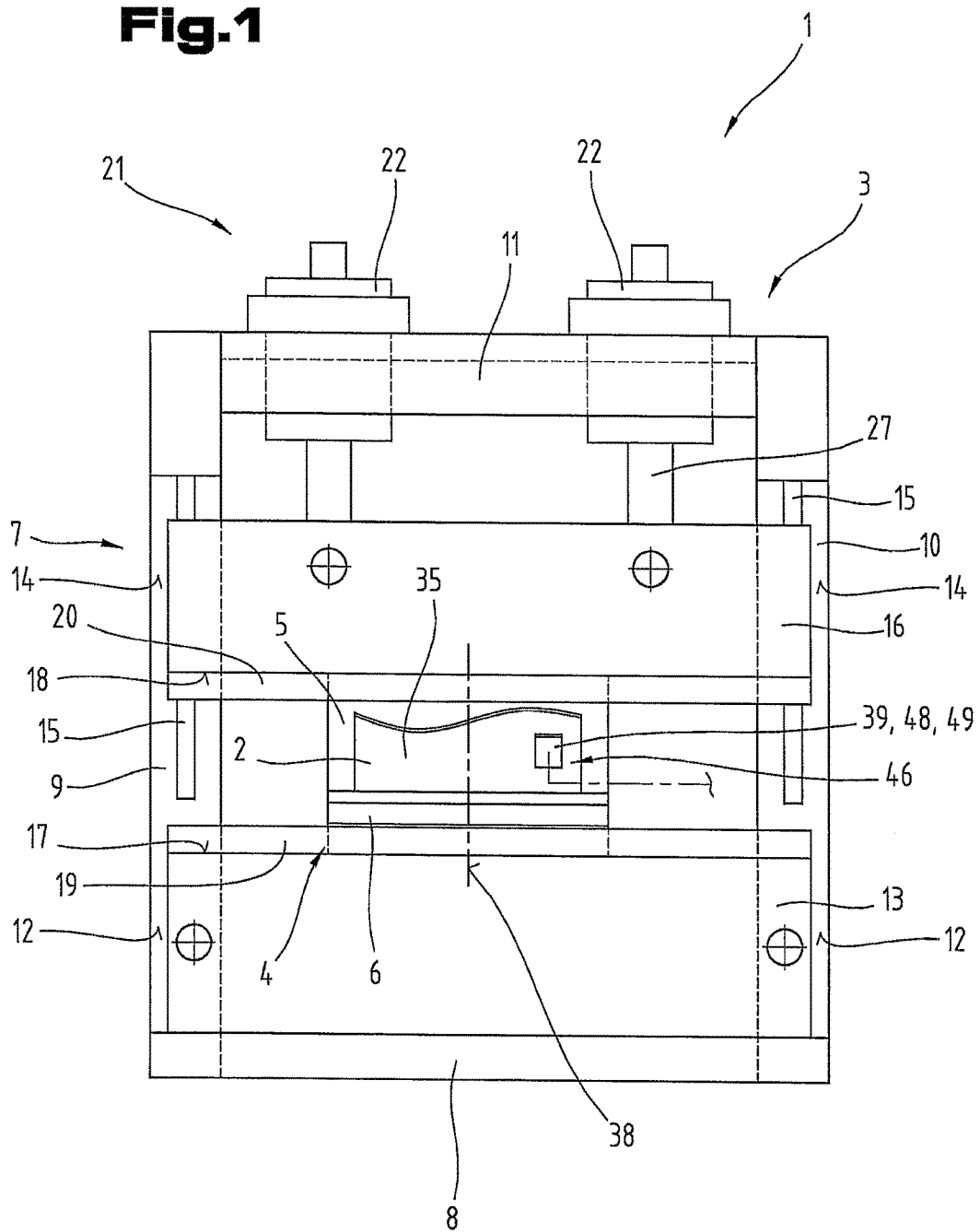
FIG. 1 a view in elevation of a production plant with a workpiece being formed by a bending press and an inclination sensor of a measuring arrangement disposed on a limb.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

Figure 2:
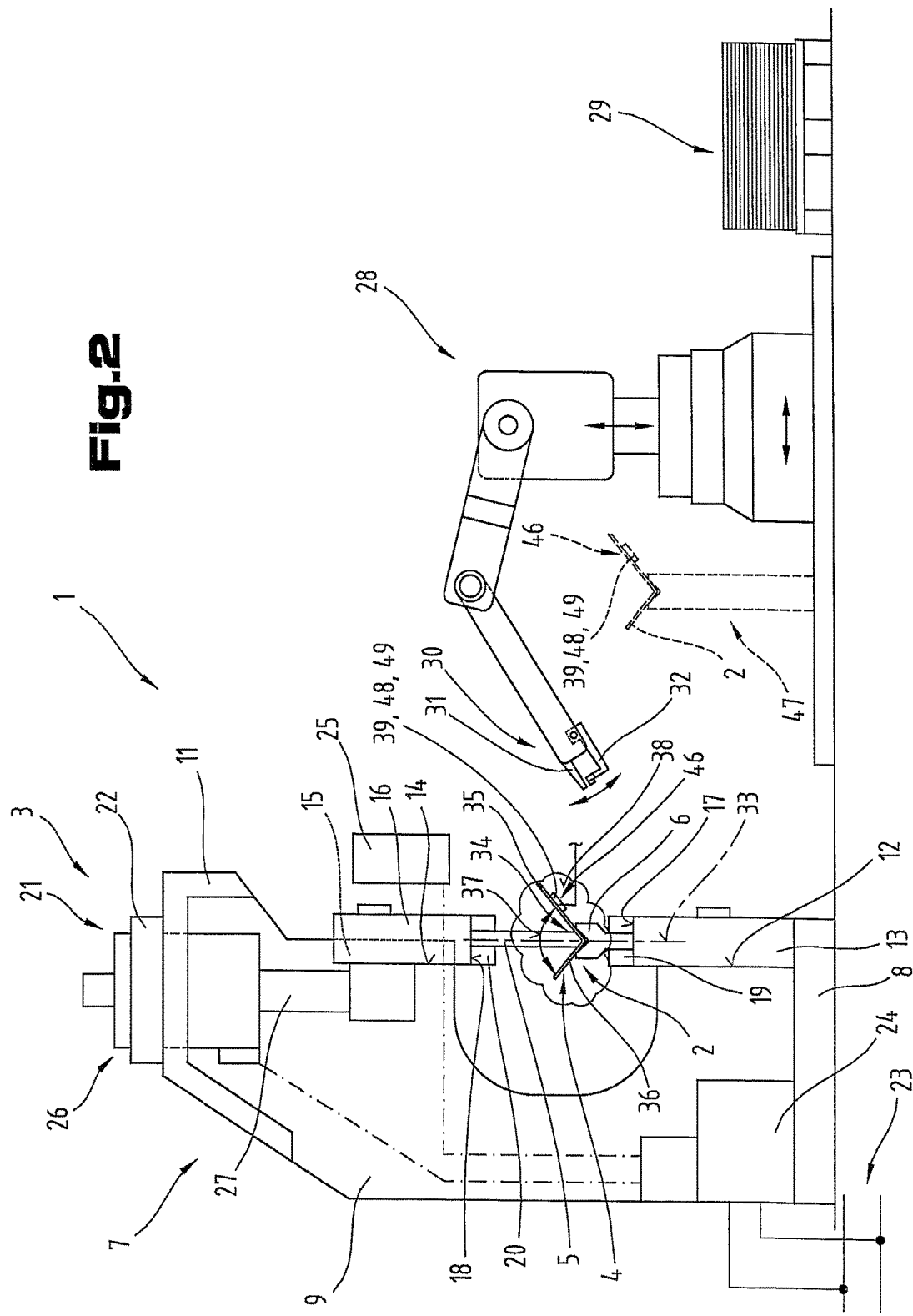
FIG. 2 a side view of the plant illustrated in FIG. 1.

FIGS. 1 and 2 are highly schematic, simplified diagrams illustrating a production plant 1, which in this particular instance is designed for air bending workpieces 2 to be produced from sheet metal by means of a die bending operation. However, it would also be possible to use a press brake in the production plant 1 to run the bending operation.

In this particular instance, the production plant 1 used for bending purposes is a bending press 3, in particular a press brake or brake press, in order to produce the workpiece or workpieces 2 between bending tools 4 which can be displaced relative to one another, such as a bending punch 5 and bending die 6.

A machine frame 7 of the bending press 3 comprises, for example, a base plate 8 on which are disposed vertically extending side panels 9, 10 disposed at a distance apart from one another and oriented parallel with one another. These are preferably connected to one another at their end regions spaced at a distance apart from the base plate 8 by a solid transverse bracing 11 comprising a sheet metal formed part, for example.

The side panels 9, 10 are approximately C-shaped to create a space for forming the workpiece 2, and a stationary press beam 13 standing in particular on the base plate 8 is secured to front faces 12 of legs of the side panels 9, 10 close to the floor. This stationary and fixed press beam 13 is also referred to as a press table, on which parts of the bending tool 4 are disposed and also retained. On front faces 14 of legs remote from the base plate 8, another press beam 16, in particular a pressing beam, is mounted in a guide arrangement in linear guides 15 and is displaceable relative to the press beam 13 constituting the table beam. Disposed on mutually opposite front faces 17, 18 of the two press beams 13, 16 and extending parallel with one another are tool holders 19, 20 which can be fitted with bending tools 4. The bending tool or tools 4 may also be held on the tool holders 19, 20 with adapters connected in between, although these are not illustrated.

As a drive system 21 for the displaceable press beam 16, namely the pressing beam, the illustrated bending press 3 has two electrically operated drive means 22 for example, which are hard-wired to a control device 24 powered from a power supply 23. Operation of the bending press 3 is controlled using an input terminal 25 wired to the control device 24, for example.

The drive means 22 are preferably spindle drives 26 operated by electric motors, of a generally known type, to which actuator means 27 for a reversible positioning movement of the top press beam 16 constituting the pressing beam are drivingly connected, for example.

To avoid making this description unnecessarily long, further details about the operation of such a bending press 3, such as safety systems, stop systems and control devices for example, will not be given in the description.

The production plant 1 may also have a manipulator 28 illustrated on a simplified basis in FIG. 2, which takes at least one piece from a schematically indicated supply stack 29 of metal sheets to be formed or bent and transfers it to the working area of the bending press 3. The manipulator 28 in turn comprises a schematically illustrated gripper 30, which in turn has gripping fingers 31, 32. The gripping fingers 31, 32 each have clamping surfaces on the side facing the workpiece 2 to be produced. By pivoting the two gripping fingers 31, 32 towards one another and applying a sufficient clamping force, the metal sheet or workpiece 2 to be produced is held by the manipulator 28 and moved and positioned accordingly due to the co-operating clamping surfaces. The gripping fingers 31, 32 of the gripper 30 ensure an appropriate grip and subsequently a sufficient hold generated by the clamping movement for the workpiece 2 to be produced from the sheet metal.

As also illustrated on a simplified basis, the two press beams 13, 16, in particular their tool holders 19, 20, and the bending tool 4 retained thereon with its bending punch 5 and bending die 6, define a working plane 33 extending between the press beams 13, 16 as viewed in the longitudinal direction thereof. The working plane 33 preferably extends centrally relative to the press beams 13, 16 and the tool holders 19, 20 disposed on them. In the embodiment described as an example here, this is a vertically oriented plane, in which a bending region 34 defined by the bending tool 4 is disposed or formed. By bending region 34 is meant the region which is used to create the workpiece 2 to be produced from what is the as yet unformed metal sheet, usually lying flat or for ongoing processing of an already preformed workpiece 2 for which at least one additional bending region 34 is provided.

The bending region 34 usually lies in the working plane 33 and is formed or defined by the co-operating components of the bending tool 4, namely the bending punch 5 and bending die 6. The bending region 34 is a bending line on the workpiece 2 to be produced which usually preferably extends in a straight line and, on either side of it, respective limbs 35, 36 resulting from the completed bending operation. Depending on what geometry is desired or is to be produced on the workpiece 2, the two limbs 35, 36 subtend a bending angle 37. This bending angle 37 is measured in a reference plane 38 oriented perpendicular to the bending line, as indicated in FIGS. 1 and 2. The reference plane 38 is in turn also preferably oriented so that it extends in the direction perpendicular to the working plane 33.

As also illustrated on a very simplified basis in FIG. 2, for each limb 35 of the workpiece 2 to be produced, which in this instance are directed towards the operating area of the bending press 3 and manipulator 28, an angle-measuring device 50 is provided, which comprises an inclination sensor 39 mounted so as to be displaceable to enable measurements to be taken. In order to measure changes in angle with its integrated sensors, the inclination sensor 39 uses the direction of gravity as its reference direction and in particular is able to determine angular positions relative to a vertical or horizontal reference direction and make these available as measurement values for further processing. Being an electrical measuring element, the inclination sensor 39 may in turn be connected to the control device 24 and/or the input terminal 25. The expression connected in this context not only means a hard-wired connection using a cable, not illustrated, but also a wireless connection such as a radio connection or similar, for example. This connection might also be to an evaluation unit and/or a computer unit, not illustrated, which detects the measurement value or values determined by the inclination sensor 39 and optionally runs a conversion or determines an angle value to enable the ongoing movement of the bending press 3 with its bending tools 4 to be controlled so that the predefined bending angle 37 can be produced on the workpiece 2.

As indicated by broken lines in FIG. 2, the angle-measuring device 46 may also be disposed at a distance apart from the bending tool 4, e.g. in the form of a separate measuring station 47 within the production plant 1.

Figure 3:
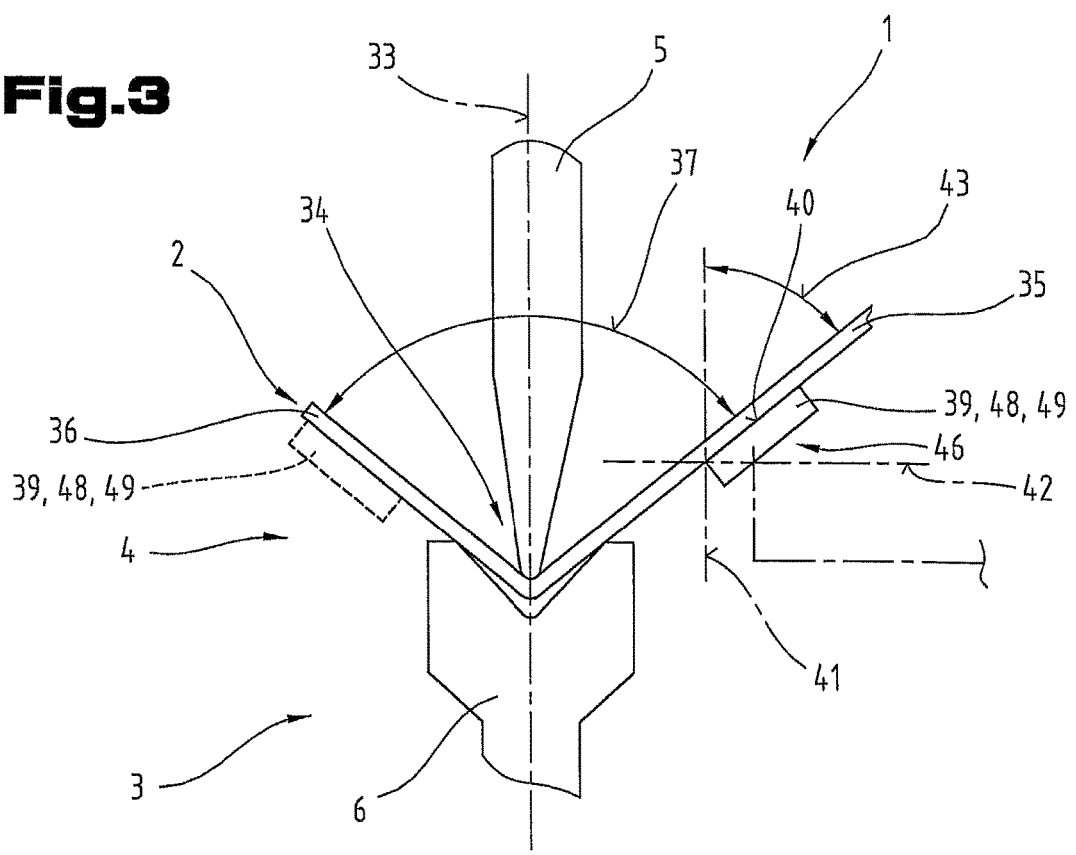
FIG. 3 a detailed view on a larger scale showing the workpiece illustrated in FIG. 2 in the bending tool.

FIG. 3 illustrates a detail of the workpiece 2 from FIGS. 1 and 2, this diagram being purposely shown on a larger scale. The bending tool 4 here is formed by the bending punch 5 and bending die 6. What is preferably an air bending operation is run using the bending punch 5, and the working plane 33 extends centrally relative to the bending tool 4, as illustrated. Illustrated on a simplified basis, the workpiece 2 has its two limbs 35, 36 on either side of the working plane 33. In this particular case, a symmetrical deformation of the two limbs 35, 36 relative to the working plane 33 takes place due to the symmetrical disposition of the bending die surfaces of the bending dies 6, although these are not illustrated. The two limbs 35, 36 subtend the bending angle 37.

As schematically indicated in FIG. 2, the inclination sensor 39 is disposed lying in contact with at least one of the limbs 35, 36 of the workpiece 2 and is also preferably retained on it in a stationary arrangement. The inclination sensor 39 has a reference surface 40. This reference surface 40 constitutes a base surface of the inclination sensor 39, which is used to obtain a position in contact with a surface portion of the surface of the sheet metal or the workpiece 2 to be produced from it. However, it would also be possible to provide an additional holding device between the inclination sensor 39 and the surface section of the sheet metal or workpiece 2, although this is not illustrated. It lies on the surface section of the metal, where it is also retained, on the one hand, and supports the inclination sensor 39 on the other hand. The holding device would be designed having surfaces oriented plane parallel with one another in order to rule out an error in the measurement of the angle and to obviate the need for a separate adjustment or calibration operation.

The sheet metal piece, which is usually flat but may also be a pre-edged or bent workpiece 2, is placed between the bending tools 4 for further processing to enable the bending operation to be carried out. Once the sheet metal or workpiece 2 to be processed is positioned between the bending tools 4 which are still disposed apart from one another, the inclination sensor 39 can be placed on at least one of the limbs 35, 36 from this point. During the bending operation or alternatively on completion of the bending operation, the inclination sensor 39 is placed on at least one the limbs 35, 36 and the measuring operation implemented. If the inclination sensor 39 is placed on at least one of the limbs 35, 36 before the start of the bending operation already, it may be placed on this surface portion at least with effect from or before the start of as well as during the entire bending operation. In the latter case, this means that the inclination sensor 39 changes position together with the limb 35, 36 being formed and remains in contact with this surface portion starting from the non-formed initial position until the end of bending. Depending on the choice and design of the inclination sensor 39, a measurement value is determined so that the angular position of at least one limb 35, 36 formed by the bending operation can be determined relative to a reference plane 41 and/or 42. It is preferable to opt for a stationary arrangement for holding the inclination sensor 39 on the surface section of the sheet metal. Irrespective of this, it would also be possible to press the inclination sensor 39 onto the surface section of the sheet metal by means of a pivotable lever arrangement by applying a spring force.

Depending on the orientation and operating mode of the inclination sensor 39, the reference planes 41, 42 may be in a different position or spatial direction from one another. For example, reference plane 41 illustrated in this instance is parallel with the working plane 33 and oriented so as to coincide with it. Another possible arrangement might be a machine plane, for example, as illustrated by the other reference plane 42 indicated. If the bending press 3 is disposed in a totally horizontal orientation, in particular in the region of its workpiece or sheet metal support surface in the region of bending tool 4, this reference plane 42 is also oriented parallel with the latter. Based on this orientation of the bending press 3, the other reference plane 42 extends at an angle of 90° to the working plane 33 and in a horizontal orientation.

As an alternative or in addition, another option would be one such as illustrated in the region of the other limb 36 for example, where another inclination sensor 39 may be provided as indicated by broken lines. This inclination sensor 39 is also held in a stationary arrangement, in contact with a surface portion of the sheet metal or the limb 35, 36 to be produced in order to take measurements.

The inclination sensor 39 might be provided in the form of a single axis inclination sensor, for example. This being the case, however, care must be taken to ensure that the inclination sensor and its measuring direction are oriented precisely. The measuring direction of the sensor must then be oriented at a right angle to the bending line extending in the bending region 34. This axial direction in the case of such presses is denoted by "z".

If, on the other hand, the inclination sensor 39 used is a biaxial inclination sensor, it may span a measurement plane defined by two measuring directions or measuring beams oriented at a right angle to one another, fec. In this instance, this measurement plane spanned by the two measuring directions or measurement axes is oriented parallel with the reference surface 40 of the inclination sensor 39. This enables two axes to be evaluated when determining the angular position, in which case the inclination sensor 39 does not have to be oriented relative to the bending line quite so exactly as the previously described single axis inclination sensor 39. However, it would also be possible to use a multi-axis inclination sensor which is able to determine angles relative to more than two axes.

In the case of many inclination sensors, the measurement of the inclination of their reference surface 40 is taken relative to gravity—in other words in a perpendicular orientation. As a result, it is possible to determine an angle of inclination 43, for example of the limb 35, relative to the perpendicularly extending base measuring direction of the inclination sensor 39 or angle-measuring device. This approach has long been known and the way in which the inclination sensor 39, in particular the angle-measuring device, works will therefore not be described in further detail here.

It has proved to be of particular advantage if the inclination sensor 39 used is one based on MEMS technology, for example. The abbreviation MEMS stands for Micro-ElectroMechanical System and such inclination sensors 39 are characterized by small dimensions down to a few millimeters.

Another option would be to provide several differently oriented inclination sensors 39 for the reference surface 40, in which case the angle-measuring device 46 will have a total measuring range for determining inclination and the total measuring range is subdivided into several, in particular mutually overlapping, partial measurement ranges. The inclination sensor 39 used as the angle-measuring device 46 may also comprise several individual sensors and each of the individual sensors covers a partial measurement range of the total possible measurement range. Splitting the total measurement range into individual partial measurement ranges increases measuring accuracy. This is particularly the case if the individual partial measurement ranges disposed immediately adjacent to one another mutually overlap.

The inclination sensor 39 or the inclination sensors 39 serving as the angle-measuring device may also remain on the limb or limbs 35, 36 after the bending operation is completed, disposed on the surface portions and preferably held stationary until the limb has rebounded once the bending force applied during the bending operation has been halted, at least for the most part, to enable the actual bending angle 37 subtended by the limbs 35, 36 to be exactly determined, for example. The way in which this is determined is that after the bending operation, the bending tool 4 is opened to the extent that the two limbs 35, 36 are held between the bending tools 4 without any pressing force or bending force being applied and in this non-forming position, the angle of inclination 43 on at least one of the limbs 35, 36 of the workpiece 2 to be produced is determined. An appropriate calculation can then be run, for example if using two inclination sensors 39, to compute the bending angle 37.

The inclination sensors 39 disposed on the limb or limbs 35, 36 can be retained so that they sit in contact with the respective intended surface portion of the sheet metal or workpiece 2 to be produced, in particular in a fixed or stationary arrangement, by a variety of means. For example, the means for securing the inclination sensor 39 om the surface portion of the limb 35, 36 may be selected from the group comprising magnetic holders, a detachable adhesive connection, suckers, spring clamps, mechanical clamps, spring-assisted holders, manual holders, adhesion. These ensure that the inclination sensor 39 sits in a reliably retained and secured arrangement in contact with the respective surface portion of the surface of the limb or limbs 35, 36.

If the machine plane or working plane 33 is not disposed parallel with and/or at a right angle to one of the reference planes 41, 42 described above, for example, it is necessary to carry out an operation to reference the inclination sensor 39 or angle-measuring device prior to running the bending operation. This enables this variance from the ideal position to be determined so that a corresponding correction can be applied to the determined angle of inclination 43 to be calculated and then to the bending angle 37. During the course of the calibration process, an inclined position of the sheet metal or a limb 35, 36 relative to one of the reference planes 41 and/or 42 can be determined and compensated as part of the calibration operation, for example. The respective measuring direction or the orientation of the angular position of the reference surface 40 of the inclination sensor 39 relative to the reference plane 41 and/or 42 can be ascertained and the variance from the theoretical zero position determined accordingly. This correction value is then taken into account when subsequently determining the angle.

By positioning and securing the inclination sensor 39, usually in a preferably fixed arrangement, before running the bending operation, the bending angle 37 can be measured both during and after completing the bending operation as well as after a potential rebound of the limb. Measuring the measured inclination of the reference surface 40 of the inclination sensor 39 relative to the vertical enables the bending angle 37 to be derived. If a biaxial inclination sensor 39 is used as described above, corresponding sensor values are determined as a measure of the inclination in two measuring directions. For example, the voltage values of the inclination sensor 39 can be converted to the respective angle of inclination 43 by vector geometry, thereby enabling the bending angle 37 to be derived.

The angle measurement could also be taken with an operator simply holding the inclination sensor 39 in contact, in which case additional holding devices can be dispensed with.

Figure 4:
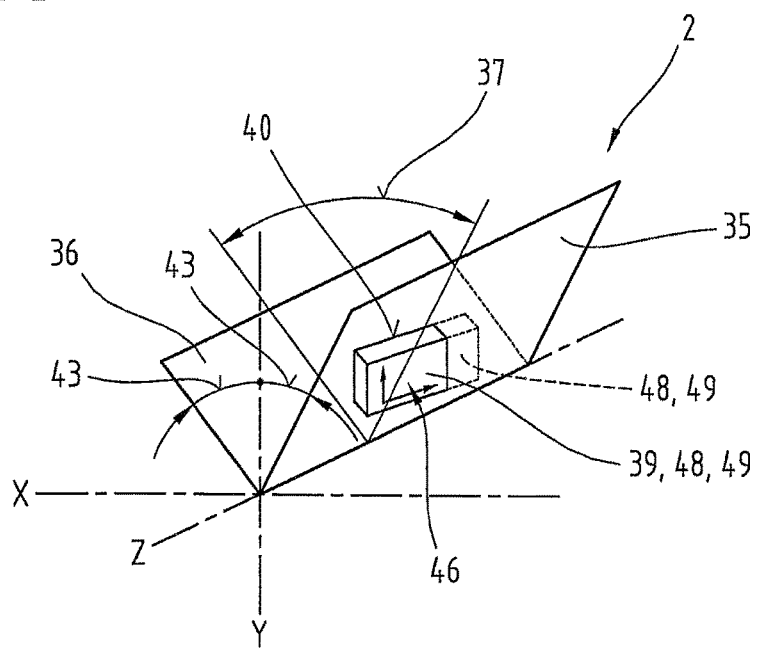
FIG. 4 a diagrammatic illustration of an inclination sensor of the measuring arrangement disposed on a limb.

FIG. 4 provides another simplified illustration of the workpiece 2 with its two limbs 35, 36 and in this instance, the inclination sensor 39 is provided on only one of the limbs—namely limb 35. The inclination sensor 39 illustrated here is a biaxial inclination sensor and the two measuring directions or measurement axes are oriented so as to extend at a right angle to one another, as indicated. As also illustrated, the inclination sensor 39 sits in a slightly turned position with its two measuring directions, indicated by arrows, in a plane formed by limb 35 relative to the direction through the axis denoted by "z". In the case of a biaxial sensor, this is not so important. In an as yet non-formed, flat initial position of the sheet metal or limb 35, 36, the inclination sensor 39 is oriented with its measuring directions relative to the axis denoted by "y". Accordingly, this is a vertical axis about which the inclination sensor 39 can be turned.

The inclination sensor 39 is again disposed with its reference surface 40 on a surface section of at least one of the limbs 35, 36. To enable the bending angle 37 subtended by the limbs 35, 36 to be determined, yet another inclination sensor 39 is provided on the other limb 36 of the workpiece 2 to be produced, although this is not illustrated. The measurement is taken in the same way as described in detail above with reference to FIG. 3.

FIGS. 5 and 6 illustrate another embodiment of the measuring arrangement of inclination sensors 39 which may be construed as an independent embodiment in its own right, the same component names and reference numbers being used to denote parts that are the same as those described in connection with FIGS. 1 to 4 above. To avoid unnecessary repetition, reference may be made to the detailed description of FIGS. 1 to 4 above. It should be pointed out that although an inclination sensor 39 is illustrated on either side respectively of the working plane 33 in this instance, it would also be possible to provide an inclination sensor 33 on only one side of the working plane 33. In order to increase the measuring accuracy in the situation where the workpiece 2 being produced has a bigger longitudinal extension in the direction of the bending tool 4, however, another option would be to provide several inclination sensors 39 on the same side of the working plane 33. In this embodiment, the inclination sensor 39 or the inclination sensors 39 is or are secured by means of an elastic support element 44, for example in the form of a leaf spring made from spring steel or a similar durable elastic material.

When running the bending operation, the inclination sensors 39 are placed on the mutually facing surfaces of the workpiece 2 with the limbs 35, 36 to be produced. From this instant, the angle of inclination 43 is determined as described above by at least one inclination sensor 39 or by both inclination sensors 39 and the bending angle 37 subtended by the limbs 35, 36 is then calculated from this. The inclination sensor or sensors 39 may be configured so that they already take an absolute measurement of the angle of inclination 43. In this case, it is not absolutely necessary for the inclination sensor or sensors 39 to be positioned in an arrangement in contact with the surface portion of at least one limb 35, 36 of the workpiece 2 to be produced and secured thereto right from or before the start of the bending operation.

In order to obtain even greater flexibility of the entire measuring arrangement incorporating the inclination sensor 39 and the support element 44, it may be of advantage if the support element 44 is connected to the bending tool 4, in particular the bending punch 5, so that it can be replaced or is interchangeable. This enables support elements 44 of different lengths to be used. Another option would be for the support element 44 to be based on an offset type of design as indicated by broken lines in FIG. 5, so that a measuring operation can be run right from the start of the bending operation. However, this is only possible if the inclination sensor 39 is in contact with specified surface portion of the workpiece 2.

The bending operation and the associated operation of determining the bending angle 37 may be run in such a way that the bending operation is started and then the limbs 35, 36 are then able to rebound when the pressure is released. Once the pressure has been released, the operation of measuring the angular position of the limbs 35, 36 is then run and another bending operation is run if necessary to enable exactly the predefined bending angle 37 to be obtained on the workpiece 2. Once the pressure on the workpiece 2 has been relieved and it has been removed from the bending tool 4, the inclination sensor or sensors 39 is or are returned to the initial position by the support element 44 by deforming the latter. The next metal sheet to be deformed can then be placed in the bending tool 4 and another bending operation run.

As may also be seen from FIGS. 1 to 8, in addition to the inclination sensor 39, the angle-measuring device 46 may also comprise a rotary rate sensor 48 and/or a temperature sensor 49 which are combined with the inclination sensor 39 and in particular integrated with it as a component unit and which are also connected to the control device 24. Such a combination is possible with all the embodiments described and illustrated above, offering all the advantages that will be described below. The other optional sensors can be positioned in the same manner and with the same means as those described above in connection with the inclination sensor 39.

As illustrated in FIG. 7 and FIG. 8, the angle of inclination 43 measured by the inclination sensor 39 is correlated with measurement values of the rotary rate sensor 48 by the control device 24, thereby ensuring even greater accuracy and reliability of the determined angle of inclination 43. The angular velocities of the rotary rate sensor 48 measured by the rotary rate sensor 48 relative to one or more axial directions are converted in the control device 24 into a rotary angle travelled by means of a computed integration process, for which purpose an angle of inclination supplied by the inclination sensor 39 as a reference is applied as the integration constant.

Using two different types of sensor in this way combines the advantages of the two sensor types because on the one hand, the inclination sensor 39 offers a high measuring accuracy with a low zero error but a relatively sluggish mode of detecting measurement values and on the other hand, the rotary rate sensor 48 offers a highly dynamic, quick mode of detecting measurement values but with the disadvantage of a considerable zero error and a sensor drift, so that the disadvantages of the two systems can be largely eliminated by merging and correlating the measurement values.

In particular, a correlation using a so-called Kalman filter, the principle of which is often used for the inertial navigation of aircraft for example, enables faults caused by the sensors 39, 48, 49 and distortions to measurement values caused by applying estimation functions for the actual measurement value or angle of inclination 43 to be significantly reduced.

In the diagram illustrated in FIG. 7, the Kalman filter 50 is used to determine a better estimated value for the integrated rotary angle from the measured angular velocities, for which purpose the measurement values supplied by the inclination sensor 39 are applied and the estimated values supplied by the Kalman filter 50 are forwarded to a element 51 for correcting the measurement value of the angular velocity.

Alternatively, as illustrated in FIG. 8, the Kalman filter 50 may also be used to determine an estimated value for the measurement error of the angle of inclination 43 measured by the inclination sensor 39 on the basis of a difference between the angle of inclination 43 determined by the inclination sensor 39 and the angle of inclination 43 determined by means of the rotary rate sensor 48 and forward this estimated error to a correction element 51 for the rotary measurement error. This makes the angle measurement more dynamic and the angular velocity can be dispensed with in the status specification of the Kalman filter. Unlike the mode illustrated in FIG. 7, the integration of the estimated angular velocity takes place outside of the Kalman filter in this instance.

As illustrated in FIG. 7 and FIG. 8, another option is to provide a temperature sensor 49 for running a temperature compensation.

For the sake of good order, finally, it should be pointed out that, in order to provide a clearer understanding of the structure of the production plant 1, in particular its angle-measuring device 46 formed by the inclination sensor or sensors 39, it and its constituent parts are illustrated to a certain extent out of scale and/or on an enlarged scale and/or on a reduced scale.

The objective underlying the independent inventive solutions may be found in the description.

The embodiments illustrated as examples represent possible variants of the production plant 1, in particular its angle-measuring device 46 formed by the inclination sensor or sensors 39, and it should be pointed out at this stage that the invention is not specifically limited to the variants specifically illustrated, and instead the individual variants may be used in different combinations with one another and these possible variations lie within the reach of the person skilled in this technical field given the disclosed technical teaching. Accordingly, all conceivable variants which can be obtained by combining individual details of the variants described and illustrated are possible and fall within the scope of the invention. Furthermore, individual features or combinations of features from the different embodiments described and illustrated as examples may be construed as independent inventive solutions in their own right.

Above all, the individual embodiments of the subject matter illustrated in FIGS. 1, 2, 3; 4; 5, 6 constitute independent solutions proposed by the invention in their own right. The objectives and associated solutions proposed by the invention may be found in the detailed descriptions of these drawings.

| List of reference numbers | |
|---|---|
| 1 | Production plant |
| 2 | Workpiece |
| 3 | Bending press |
| 4 | Bending tool |
| 5 | Bending punch |
| 6 | Bending die |
| 7 | Machine frame |
| 8 | Base plate |
| 9 | Side panel |
| 10 | Side panel |
| 11 | Transverse bracing |
| 12 | Front face |
| 13 | Press beam |
| 14 | Front face |
| 15 | Linear guide |
| 16 | Press beam |
| 17 | Front face |
| 18 | Front face |

-continued

| List of reference numbers | |
|---|---|
| 19 | Tool holder |
| 20 | Tool holder |
| 21 | Drive system |
| 22 | Drive means |
| 23 | Power supply |
| 24 | Control device |
| 25 | Input terminal |
| 26 | Spindle drive |
| 27 | Actuator means |
| 28 | Manipulator |
| 29 | Supply stack |
| 30 | Gripper |
| 31 | Gripping finger |
| 32 | Gripping finger |
| 33 | Working plane |
| 34 | Bending region |
| 35 | Limb |
| 36 | Limb |
| 37 | Bending angle |
| 38 | Reference plane |
| 39 | Inclination sensor |
| 40 | Reference surface |
| 41 | Reference plane |
| 42 | Reference plane |
| 43 | Angle of inclination |
| 44 | Support element |
| 45 | Connecting line |
| 46 | Angle-measuring device |
| 47 | Measuring station |
| 48 | Rotary rate sensor |
| 49 | Temperature sensor |
| 50 | Kalman filter |
| 51 | Correction element |
| 52 | Correction element |

The invention claimed is:

1. A production plant comprising
a bending press having a press beam,
at least one bending tool connected to the press beam, and
at least one angle-measuring device for determining an angular position of at least one limb of a workpiece formed by a bending operation of the bending press with the bending tool relative to a reference plane of the bending press,
wherein the angle-measuring device comprises at least one inclination sensor with a reference plane based on the direction of gravity and contained inside the inclination sensor itself, the inclination sensor having a reference surface, and the inclination sensor is supported by the angle-measuring device so that the inclination sensor is placed with the reference surface lying in direct contact with a surface portion of said at least one of the limbs of the workpiece,
wherein the inclination sensor measures an angle between the reference surface and the direction of gravity and thereby determines an angle of inclination of at least one of the limbs of the workpiece relative to the reference plane of the bending press or relative to the reference plane of the inclination sensor.

2. The production plant according to claim 1, wherein the inclination sensor is a single axis sensor.

3. The production plant according to claim 1, wherein the inclination sensor is a biaxial sensor.

4. The production plant according to claim 1, wherein several differently oriented inclination sensors co-operate with the reference surface so that the angle-measuring device has a total measuring range for determining inclination and the total measuring range is subdivided into several partial measurement ranges each assigned to an inclination sensor.

5. The production plant according to claim 1, wherein the angle-measuring device is disposed adjacent to the bending tool of the bending press.

6. The production plant according to claim 1, wherein the angle-measuring device is disposed at a distance from the bending tool of the bending press.

7. The production plant according to claim 1, wherein the inclination sensor is held in contact with the surface portion of the limb of the workpiece to be produced by a holder.

8. The production plant according to claim 7, wherein the holder of the inclination sensor is selected from the group consisting of magnetic holders, a detachable adhesive connection, suckers, spring clamps, mechanical clamps, spring-assisted holders, manual holder, and adhesion.

9. The production plant according to claim 1, wherein the inclination sensor is disposed on and connected to an elastically deformable support element, and the support element is connected to the bending tool, and the inclination sensor is disposed at a distance apart from a working plane defined by the press beam the working plane being in a vertical direction with reference to the working plane.

10. The production plant according to claim 1, wherein the angle-measuring device comprises at least two inclination sensors for determining the angular position configured for placement respectively on a limb of the workpiece to be produced formed by a bending operation.

11. The production plant according to claim 1, wherein the angle-measuring device comprises a rotary rate sensor, the measurement values of which can be correlated with the measurement values of the inclination sensor in a control device of the angle-measuring device.

12. The production plant according to claim 11, wherein the angle-measuring device comprises a temperature sensor, the measurement values of which can be transferred to a control device of the angle-measuring device for a temperature compensation of the measurement values from the inclination sensor and rotary rate sensor.

13. The production plant according to claim 12, wherein the inclination sensor and/or the rotary rate sensor and/or the temperature sensor are based on MEMS technology.

14. A method of determining an angular position of at least one limb of a workpiece comprising:
forming the workpiece by a bending operation relative to a reference plane of a bending press used to perform the bending operation;
providing an angle-measuring device comprising at least one inclination sensor with a reference plane based on the direction of gravity and contained within the inclination sensor itself;
disposing the at least one inclination sensor so that a reference surface of said inclination sensor lies in direct contact with a surface portion of at least one of the limbs of the workpiece; and
measuring the angle between the reference surface and the direction of gravity with the inclination sensor and thereby
determining an angle of inclination of the at least one limbs of the workpiece relative to the reference plane of the bending press or relative to the reference plane of the inclination sensor.

15. The method according to claim 14, wherein the angle of inclination determined by the inclination sensor is determined using a single axis sensor.

16. The method according to claim 14, wherein the angle of inclination determined by the inclination sensor is determined using a biaxial sensor.

17. The method according to claim 14, wherein the angle of inclination determined by the inclination sensor is determined on the basis of MEMS technology.

18. The method according to claim 14, wherein the inclination sensor is held in contact with the surface portion of the limb of the workpiece during the bending operation.

19. The method according to claim 14, wherein the inclination sensor is held stationary in contact with the surface portion of the limb of the workpiece by a holder.

20. The method according to claim 14, wherein prior to running the bending operation, an operation of referencing the inclination sensor is run.

21. The method according to claim 14, wherein after at least partially running a bending operation, the bending tool is opened to the extent that two limbs of the at least one limb are held between the bending tools without any deforming pressing force being applied and in this position the angle of inclination of at least one of the limbs of the workpiece to be produced is determined.

22. The method according to claim 21, wherein an inclination sensor is placed respectively on each of the two limbs of the workpiece (2).

23. The method according to claim 14, wherein the measurement values of the inclination sensor are correlated with angular velocity values measured by a rotary rate sensor, and the current angular position is determined by an integration of the angular velocity values measured by the rotary rate sensor and the measurement values of the inclination sensor are used as reference values.

24. The method according to claim 23, wherein the measurement values of the inclination sensor and rotary rate sensor are correlated by applying a Kalman filter algorithm to determine the angle.

25. The method according to claim 14, wherein when determining the angle of inclination or bending angle, a temperature compensation is run based on measurement values of a temperature sensor.

* * * * *